US008031706B2

United States Patent
Kumar et al.

(10) Patent No.: US 8,031,706 B2
(45) Date of Patent: Oct. 4, 2011

(54) CIRCUITRY FOR DETERMINING NETWORK OPERATIONS IN A NETWORK DEVICE BY ADDRESSING LOOKUP TABLES WITH CONTENTS OF PROTOCOL HEADER FIELDS

(75) Inventors: Vinoj N. Kumar, Austin, TX (US); Robert J. Munoz, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 827 days.

(21) Appl. No.: 11/263,300

(22) Filed: Oct. 31, 2005

(65) Prior Publication Data

US 2007/0115984 A1    May 24, 2007

(51) Int. Cl.
*H04L 12/56* (2006.01)
(52) U.S. Cl. ....................................... 370/389
(58) Field of Classification Search .................. None
See application file for complete search history.

(56) References Cited

U.S. PATENT DOCUMENTS

| | | | | |
|---|---|---|---|---|
| 6,041,053 A * | 3/2000 | Douceur et al. | | 370/389 |
| 6,266,700 B1 * | 7/2001 | Baker et al. | | 709/230 |
| 6,356,951 B1 * | 3/2002 | Gentry, Jr. | | 709/250 |
| 6,788,683 B1 * | 9/2004 | Ikeda et al. | | 370/389 |
| 6,801,960 B1 * | 10/2004 | Ericson et al. | | 710/33 |
| 6,822,943 B1 | 11/2004 | Mantin | | |
| 6,859,454 B1 * | 2/2005 | Bowes | | 370/366 |
| 6,987,768 B1 * | 1/2006 | Kojima et al. | | 370/401 |
| 7,028,095 B1 * | 4/2006 | Foster et al. | | 709/231 |
| 7,058,664 B1 * | 6/2006 | Hsu | | 707/200 |
| 7,103,708 B2 * | 9/2006 | Etherton et al. | | 370/389 |
| 7,289,498 B2 * | 10/2007 | Yu et al. | | 370/389 |
| 7,774,497 B2 * | 8/2010 | Horgan | | 370/389 |
| 2003/0053448 A1 * | 3/2003 | Craig et al. | | 370/353 |
| 2003/0091042 A1 * | 5/2003 | Lor | | 370/389 |
| 2003/0095559 A1 * | 5/2003 | Sano et al. | | 370/419 |
| 2004/0015599 A1 * | 1/2004 | Trinh et al. | | 709/232 |
| 2004/0218593 A1 * | 11/2004 | Hammons et al. | | 370/386 |
| 2005/0021813 A1 * | 1/2005 | Kovacevic et al. | | 709/231 |
| 2005/0135351 A1 * | 6/2005 | Parmar et al. | | 370/389 |
| 2007/0133593 A1 * | 6/2007 | Shankara | | 370/463 |

* cited by examiner

*Primary Examiner* — Ayaz Sheikh
*Assistant Examiner* — Timothy J Weidner
(74) *Attorney, Agent, or Firm* — Ryan, Mason & Lewis, LLP (57) ABSTRACT

A network processor for determining one or more network operations to be performed on a packet of data in a network comprises processing circuitry and protocol indicator circuitry. The packet of data contains information populating a plurality of protocol header fields. Moreover, the protocol indicator circuitry comprises a plurality of memory elements, each memory element associated with a protocol header field in the plurality of protocol header fields. The processing circuitry determines the one or more network operations to be performed on the packet of data at least in part by addressing one or more lookup tables with the contents of a subset of the plurality of protocol header fields in the packet. This subset is determined by reference to the memory elements in the protocol indicator circuitry. Each memory element is capable of being programmed to indicate whether the associated protocol header field is to be utilized by the processing circuitry in addressing the one or more lookup tables.

21 Claims, 5 Drawing Sheets

| + | BITS 0-3 | 4-9 | 10-15 | 16-31 |
|---|---|---|---|---|
| 0 | SOURCE PORT ||| DESTINATION PORT |
| 32 | SEQUENCE NUMBER ||||
| 64 | ACKNOWLEDGEMENT NUMBER ||||
| 96 | DATA OFFSET | RESERVED | FLAGS | WINDOW |
| 128 | CHECKSUM ||| URGENT POINTER |
| 160 | OPTIONS (OPTIONAL) ||||
| 192 | OPTIONS (CONT.) ||| PADDING (TO 32) |

CIRCUITRY FOR DETERMINING NETWORK OPERATIONS IN A NETWORK DEVICE BY ADDRESSING LOOKUP TABLES WITH CONTENTS OF PROTOCOL HEADER FIELDS

FIELD OF THE INVENTION

The present invention is directed to network devices, and more specifically to circuitry for use in determining network operations to be performed in a network device.

BACKGROUND OF THE INVENTION

Packets of data in a computer network typically contain information stored in protocol header fields corresponding to the various protocols that form the protocol stack for that packet. A protocol stack is a set of network protocols that work together so that two or more computers or other devices can communicate across a network. The different protocols that form a protocol stack frequently occupy different "layers" in the Open System Interconnection (OSI) Model. A commonly used protocol stack consists of the HyperText Transfer Protocol (HTTP), Transmission Control Protocol (TCP), Internet Protocol (IP) and Ethernet Protocol.

A network device will typically comprise a network processor operative to determine which operations to perform on a packet of data by addressing one or more lookup tables with the contents of some subset of the protocol header fields contained in that packet. The particular protocol header fields that form this subset vary with the network environment and with the network device user. For example, a specific user may wish that a network device examine fields in the Asynchronous Transfer Mode (ATM) Protocol, TCP, IP and Ethernet protocol header fields to determine how to properly forward the packet to the next network device. A different user may wish to examine an entirely different set of protocol header fields. As a result, it is frequently desirable to tailor the network device to match the user's specific application.

Notwithstanding this, such user-specific programming remains problematic. For example, programming network device software specifically for a network device user's particular application may be expensive. Moreover, such user-specific programming lacks flexibility since the protocol header fields to be examined are fixed at the time the device software is written. As a result, most device manufacturers supply the same software to multiple users rather than attempt customization. This multi-user software will examine the union of what individual users may be interested in examining rather than addressing the particular needs of the specific user. Consequently, this software may examine many protocol header fields that are not of interest to a particular user while skipping over those that are of interest. This compromises performance and can increase the overhead of provisioning lookup table data since a user may need to provision data for protocol header fields that the user has little or no interest in examining.

For these reasons, there is a need for a network device that can be easily and cost-effectively tailored to examine only those protocol header fields relevant to a particular user's specific network application.

SUMMARY OF THE INVENTION

The present invention addresses the above-identified needs by providing, in illustrative embodiments, apparatus and methods allowing a network device to be tailored to utilize a particular set of protocol header fields when determining which operations to perform without requiring that the network device software be programmed specifically to utilize only those fields. The illustrative embodiments achieve this, in part, by the use of protocol indicator circuitry which can be configured to indicate which protocol header fields are of interest to the particular user. The network device consults this protocol indicator circuitry when determining which fields to use in addressing various lookup tables.

In accordance with an aspect of the invention, a network processor for determining one or more network operations to be performed on a packet of data in a network comprises processing circuitry and protocol indicator circuitry. The packet of data contains information populating a plurality of protocol header fields. Moreover, the protocol indicator circuitry comprises a plurality of memory elements, each memory element associated with a protocol header field in the plurality of protocol header fields. The processing circuitry determines the one or more network operations to be performed on the packet of data at least in part by addressing one or more lookup tables with the contents of a subset of the plurality of protocol header fields in the packet. This subset is determined by reference to the memory elements in the protocol indicator circuitry. Each memory element is capable of being programmed to indicate whether the associated protocol header field is to be utilized by the processing circuitry in addressing the one or more lookup tables.

In one of the above-noted illustrative embodiments, a router is tasked with performing network operations on packets of data in association with a local area network (LAN). The router contains a network processor which, in turn, comprises both processing circuitry and protocol indicator circuitry. The processing circuitry steps through the network protocol header fields of received packets of data. For each protocol header field, the processing circuitry references the protocol indicator circuitry which has been programmed to indicate which protocol header fields are to be used by the router in determining the operations to be performed. The processing circuitry uses the contents of these determinative protocol header fields to address both intermediate and final lookup tables.

These and other features and advantages of the present invention will become apparent from the following detailed description which is to be read in conjunction with the accompanying drawings.

DETAILED DESCRIPTION OF THE INVENTION

The present invention will be described with reference to illustrative embodiments. As a result, numerous modifications and variations can be made and the results will still come under the scope of the invention. No limitations with respect to the specific embodiments described are intended or should be inferred.

The term "network device" as used herein may comprise any type of electronic device capable of performing network operations on packets of data in a computer network. Such network devices may include, but are not limited to, routers, gateways, bridges, switches, hubs and repeaters. These devices and their many variants will be familiar to one skilled in the art. Examples of such network devices are described in, e.g., P. Seifert, *The Switch Book: The Complete Guide to LAN Switching Technology*, Wiley, 2000, which is incorporated herein by reference.

In addition, the term "packet of data" as used herein includes any unit of data for transmission in a computer network. No limitations as to the size, content or format of the data is intended by the use of this terminology.

Figure 1:
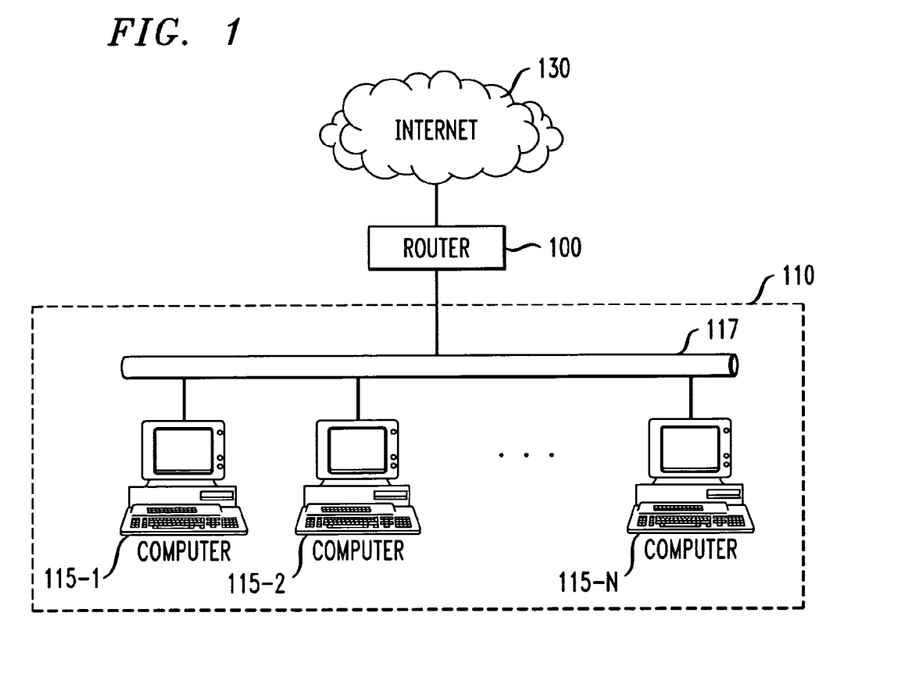
FIG. 1 shows a block diagram of an illustrative embodiment of a computer network in which the present invention is implemented.

For simplicity in describing the present invention, the invention will be illustrated with an embodiment comprising a router acting in conjunction with a simple LAN. FIG. 1 shows a router 100 implemented to service a LAN 110. In this implementation, the router 100 is the interface between the LAN 110 and the larger internet 130. The LAN 110 is shown to contain N computers, labeled 115-$i$, where $i=1, 2 \ldots N$. The computers 115-$i$ are connected to each other and to the router 100 via ethernet cabling 117.

Figure 2:
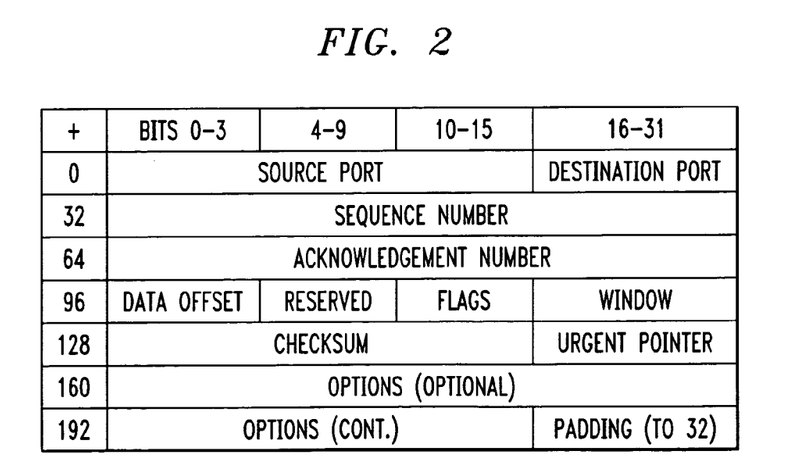
FIG. 2 shows a table of the protocol header fields in the TCP protocol.

Packets of data reaching the router 100 will contain information populating various protocol header fields associated with the protocol stack for that particular packet. As mentioned earlier, a packet of data in the internet will frequently comprise protocol header fields corresponding to the HTTP, TCP, IP and Ethernet protocols. However, a packet of data may contain protocol header fields belonging to any other network protocols, and this will not affect the functionality of the invention. FIG. 2 shows a table of the protocol header fields associated with the TCP protocol. This table also indicates how the different fields are assigned to the bits that make up the TCP protocol header information. Similar tables are commonly available for other protocols and, as a result, are not reproduced here.

One skilled in the art will recognize the meaning of each of the protocol header fields shown in FIG. 2. Moreover, the organization and meaning of the protocol header fields for all the network protocols is largely based on standards created by the Internet Engineering Task Force (IETF) in the form of Requests for Comments (RFCs). For example, RFC 793 describes in detail the protocol header fields of the TCP protocol shown in FIG. 2. These RFCs are commonly available, e.g., at the IETF web site, and are incorporated herein by reference.

Figure 3:
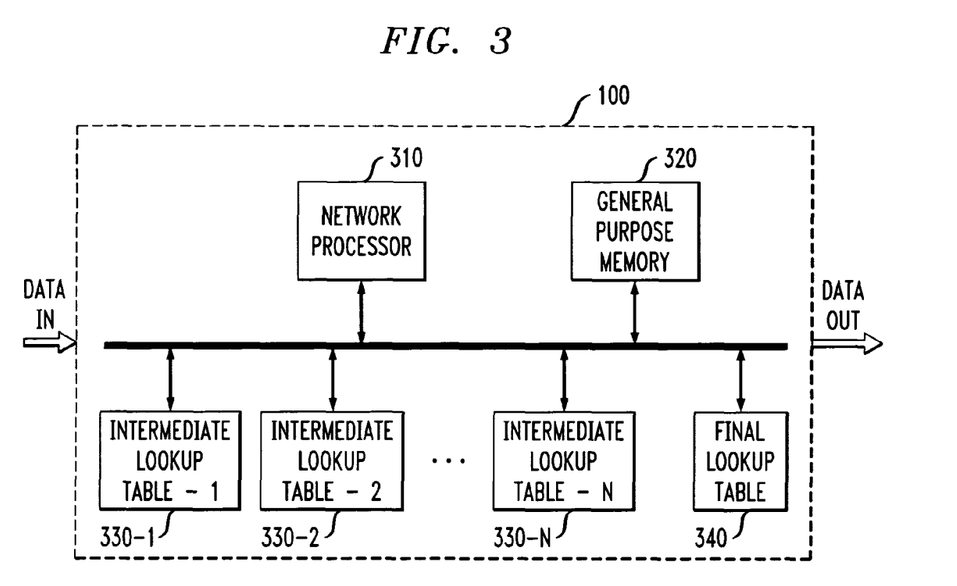
FIG. 3 shows a block diagram illustrating a network device according to an embodiment of the present invention.
Figure 4:
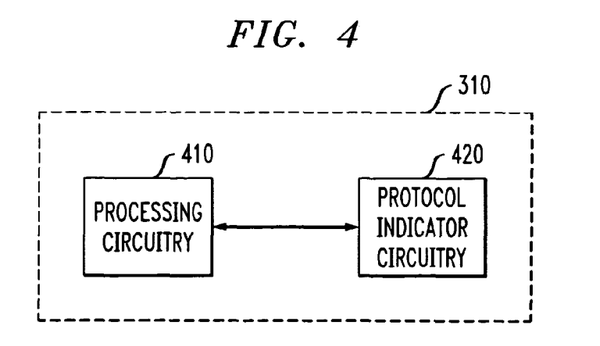
FIG. 4 shows a block diagram illustrating a network processor according to an embodiment of the present invention.

In accomplishing its functions, the router 100, like any other network device, must both determine which operations to perform on a particular packet of data, and then actually perform those operations. FIGS. 3 and 4 show block diagrams of the elements contained in the router 100 in accordance with the illustrative embodiment of this invention. FIG. 3 indicates that the router 100 contains a network processor 310 in addition to a general purpose memory 320. In addition, the router 100 also contains N intermediate lookup tables, labeled 330-$i$ where $i=1, 2 \ldots N$, and a final lookup table 340. FIG. 4 shows a further breakdown of the network processor 310. In accordance with an aspect of this invention, the network processor 310 contains at least two forms of circuitry: processing circuitry 410 and protocol indicator circuitry 420.

Figure 5:
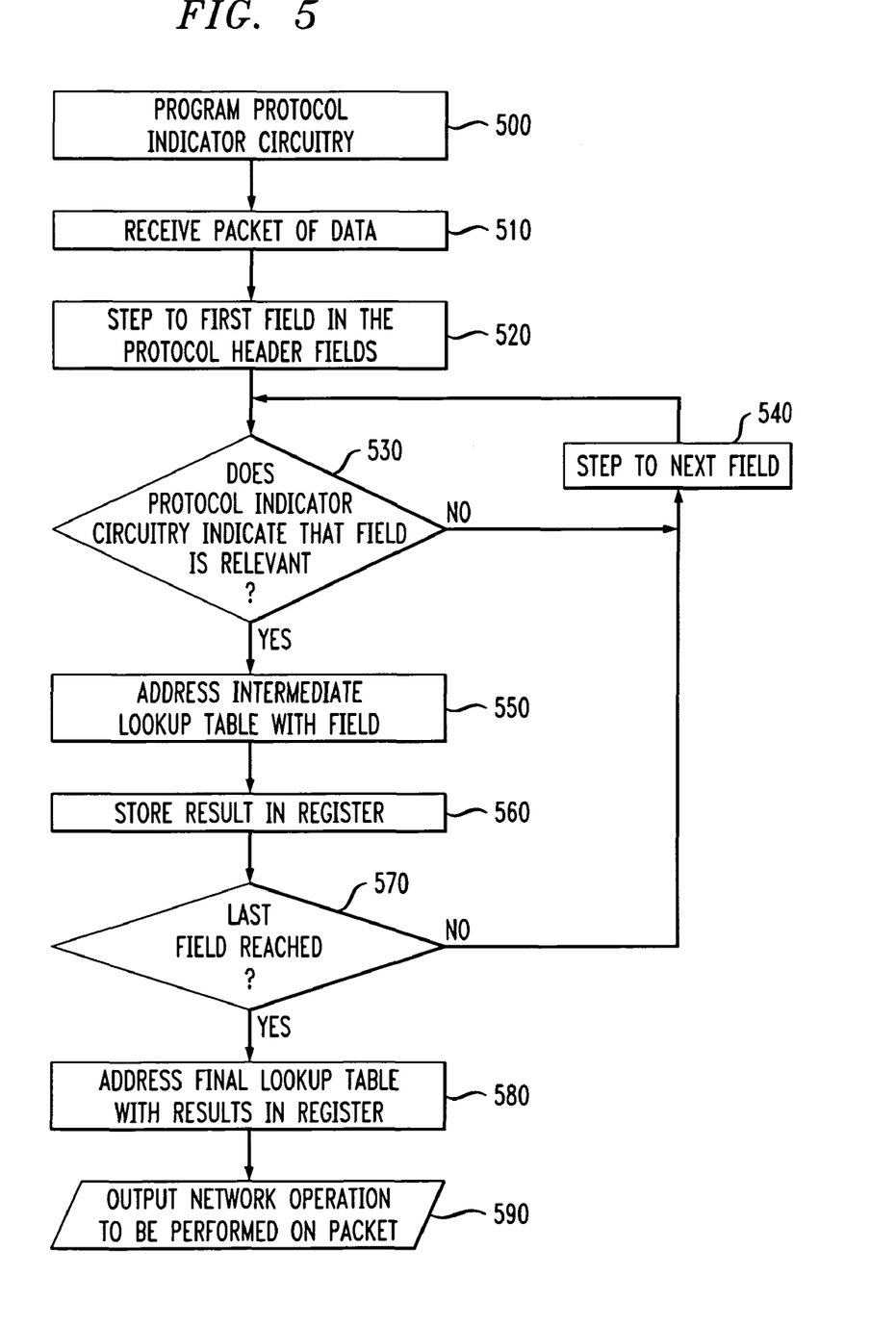
FIG. 5 shows a flow diagram of an operation determination process implemented in the FIG. 3 device in accordance with the invention.
Figure 6:
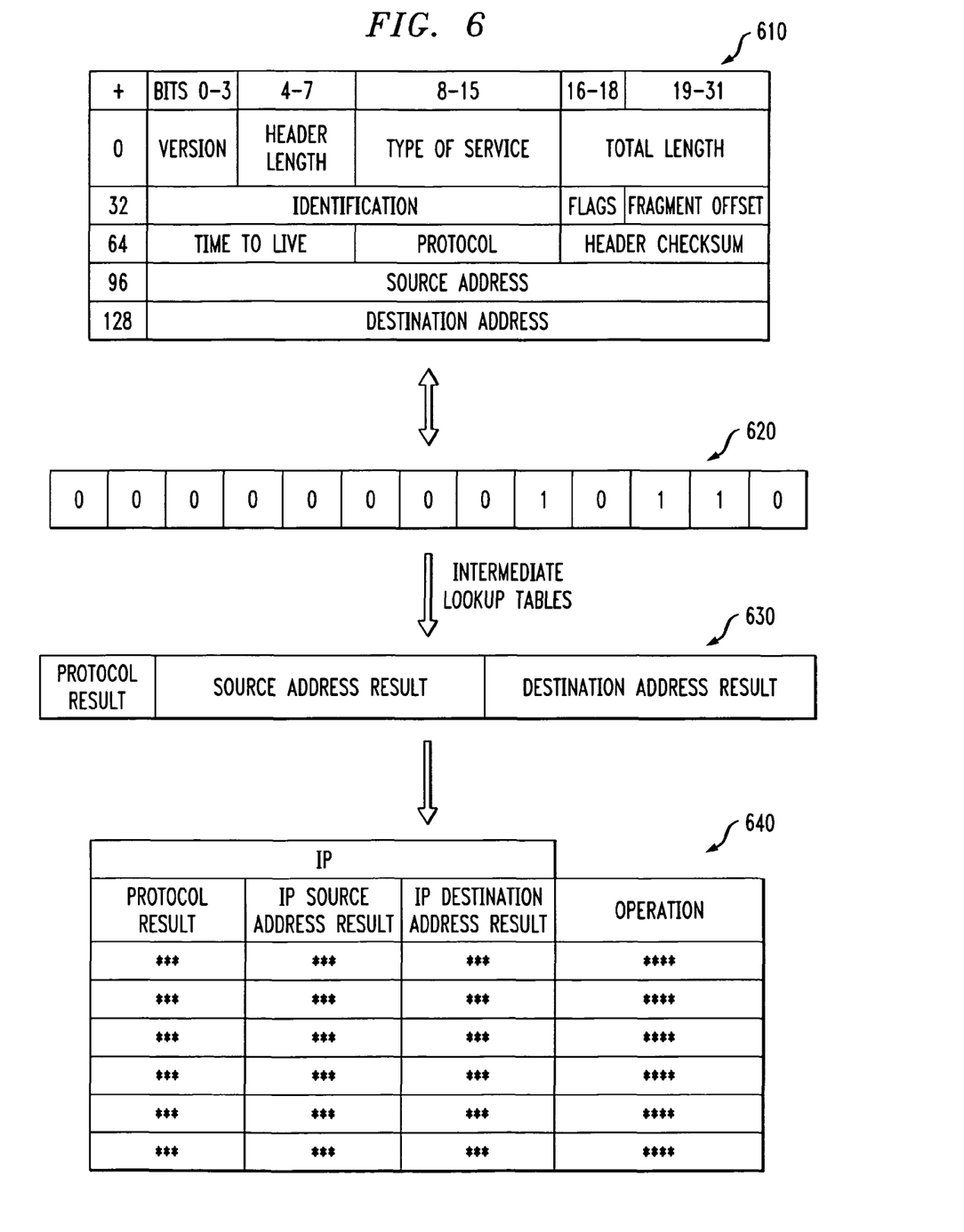
FIG. 6 illustrates the manipulation of data in accordance with the flow diagram of FIG. 5.

The functioning of these various elements will be described with reference to FIGS. 5 and 6. In FIG. 5, step 500 comprises programming the protocol indicator circuitry 420 to indicate which protocol header fields will be used in determining those network operations to be performed by the router 100. In accordance with an aspect of the invention, the protocol indicator circuitry 420 contains memory elements that are associated, or mapped, to the protocol header fields of the incoming packets. An example of such mapping is shown in FIG. 6. In FIG. 6, a table of protocol header fields for the IP protocol, 610, is shown in relation to an array of memory elements 620. In this embodiment, each memory element in the memory element array 620 has a sequential, one-to-one association with the fields shown in the table 610. For example, the fifth memory element corresponds to the fifth protocol header field when stepping sequentially through the fields left-to-right, top-to-bottom. It should be noted, however, that mapping based on the sequence of protocol header fields is just one way of associating the memory elements with the fields. One skilled in the art will recognize that there are many other methods of mapping the memory elements to the protocol header fields that will come within the scope of the invention.

For illustrative purposes, each memory element of the memory element array 620 comprises an individual bit of data capable of achieving two possible states. Nevertheless, a memory element need not necessarily be composed of a single bit in a memory. A memory element could, for example, contain a group of bits rather than one bit. In this case, the global state of the group would determine the relevance of the associated protocol header field rather than any one bit alone. Referring again to FIG. 6, each of the memory elements in the memory element array 620 is programmed to have state "1" to indicate that the associated protocol header field is determinative of the network operations, and state "0" to indicate that the associated protocol header field is not determinative of the network operations. For example, the ninth memory element in the memory element array 620 is in state "1." This indicates that the ninth protocol header field, namely the "Protocol" field in the table 610, is determinative of the operations to be performed by the network device.

The particular method of programming the protocol indicator circuitry 420 will depend on the physical implementation of this circuitry. Nevertheless, generally, the programming of memory elements will be accomplished by utilizing software acting in concert with the processing circuitry 410 to address and configure the memory elements. The act of programming the protocol indicator circuitry 420 can be accomplished, for example, by the network device user or by the manufacturer of the network device in response to the wishes of that user. It is preferable, however, that the device user be provided with "user-friendly" software with which to modify the protocol indicator circuitry 420 in response to that user's changing needs. This helps to accomplish the goal of providing a method of configuring a network device that is both easy and cost-effective to tailor to a specific user.

Once the protocol indicator circuitry 420 is programmed, the router 100 is ready to receive packets of data, namely step 510 in FIG. 5. As described earlier, the packets of data may contain information populating a number of different protocol header fields. In the next step, step 520, the processing circuitry 410 steps to the first field among these protocol header fields. In accordance with an aspect of the invention, the processing circuitry 410 then polls the protocol indicator circuitry 420 in step 530 to determine whether the memory element corresponding to the first protocol header field is in a "1" or "0" state. If the associated memory element is in the "1" state, the processing circuitry 410 knows that the field will be of importance in determining which operations to perform on the packet. In this case, the processing circuitry 410 moves to step 550. Alternatively, if the associated memory element is in the "0" state, the processing circuitry 410 moves to step 540. At step 540, the processing circuitry 410 steps to the next protocol header field in the packet and again determines the relevance of that field by reference to the protocol indicator circuitry 420.

Where the processing circuitry 410 determines that a particular protocol header field is determinative of the network operations, it then addresses intermediate lookup tables 330-$i$ with the contents of that field. Such a step is shown in FIG. 5 as step 550. The benefits of using intermediate lookup tables 330-$i$ at this point in the process is best understood by recognizing that the results of the intermediate lookups will eventually be used to address the final lookup table 340. One benefit, for example, is that the intermediate lookup tables 330-$i$ may group the possible information contained in the particular protocol header field of interest into a smaller set of categories. As a result, a category name can be used to address the final lookup table 340 in place of the actual information contained in the protocol header field, thereby, reducing the number of entries required in the final lookup table 340. Moreover, the intermediate lookup may return a result that is smaller in size than the information derived directly from the protocol header field. Advantageously, this reduces the size of the entries in the final lookup table 340.

It should be noted, however, that the use of intermediate lookup tables 330-$i$ is optional. The invention could be implemented by storing the information from the relevant protocol header fields directly in a processor register without addressing a lookup table first. This would, however, potentially require a larger and more complex final lookup table 340.

Again referring to FIG. 4, in step 560, the results of the intermediate lookup tables 330-$i$ are stored in a processor register for further use later in the process. In step 570, the processing circuitry 410 determines if the last protocol header field has been examined. If not, the processing circuitry 410 returns to step 540 where it steps to the next protocol header field. Steps 530-570 are then repeated for that particular protocol header field.

To fulfill its functions, the processing circuitry 410 needs to be capable of stepping through the possible protocol header fields contained in the packet of data. This capability is preferably provided by instructions implemented in software. However, in accordance with one of the advantages of this invention, the software is not determinative of which protocol header fields will be used to address the lookup tables. Rather, the software merely guides the processing circuitry 410 in examining each field, while the protocol indicator circuitry 420 provides the selection information. In this way, the network device can be tailored to examine only those protocol header fields relevant to a particular users's specific network application without customizing software for that particular user.

The processor register 630 in FIG. 6 shows the results of performing steps 530-570 for the thirteen protocol header fields shown in the table 610. As can be seen in the memory element array 620, protocol header fields "Protocol," "Source Address," and "Destination Address" are indicated to be determinative of the operations to be performed by the router 100. After addressing the contents of these fields to the intermediate lookup tables 330-$i$, the results of the lookup are stored in the processor register 630 as "Protocol Result," "Source Address Result," and "Destination Address Result." The wording "Result" is used here to indicate that the results from the intermediate lookup tables 330-$i$ are stored in the processor register 630 rather than the contents of the protocol header fields themselves.

It is again important to recognize that the invention is not limited to the examination and extraction of information from the IP protocol header fields like that shown in FIG. 6. To the contrary, the invention is easily scaled to determine network operations on packets of data containing protocol header fields for a large number of different protocols. The application of the invention to a single protocol in FIG. 6, therefore, is entirely for simplicity of illustration, and no limitations should be inferred therefrom.

After the processing circuitry 410 has examined all the protocol header fields contained in the packet, it uses the contents of the processor register 630 to determine the operation to be performed on the packet of data. This step is shown as step 580 in FIG. 5. An example of a final lookup table corresponding to the results stored in register 630 is shown in FIG. 6 as exemplary final lookup table 640. The exemplary final lookup table 640 keys "Protocol Result," "Source Address Result," and "Destination Address Result" to an operation to be performed by the network device. It will be observed that the size and complexity of the final lookup table 340 will be dependent on the size and variability of those register entries used to address the table. Therefore, the size and complexity of the final lookup table 340 will be decreased by the use of intermediate lookup tables 330-$i$ which can reduce the variability and the size of the register entries prior to addressing the final lookup table 340.

The many operations that a network device may be called upon to perform on a packet of data in a network will be familiar to one skilled in the art. Nonetheless, for a router, for example, such operations may include determining to which address and through which port to forward a packet. Moreover a router might be called upon to discard packets of data to implement a kind of firewalling or filtering. Finally, a router may be asked to translate network addresses form one format to another, a process commonly referred to as address mapping or network address translation.

With respect to the physical implementation of the elements in FIGS. 3 and 4, there are many possible variations falling within the scope of this invention. The processing circuitry 410 and the protocol indicator circuitry 420 may, for example, be formed in two or more discrete integrated circuits or in just a single integrated circuit. Nevertheless, despite these many choices, from the perspective of power consumption and performance, it is preferable that the processing circuitry 410 and the protocol indicator circuitry 420 be formed together on a single integrated circuit. Such embedding of memory circuitry into a logic-based integrated circuit is well known in the art. Embedded memory circuitry, for example, will frequently be produced as static random access memory (SRAM) using complementary metal-oxide-semiconductor (CMOS) technology. In SRAM, the state of a memory element may be programmed, for example, by configuring the state of a flip-flop.

Embedded memory circuitry has a number of advantages. Embedded memory can help save system power by eliminating off-chip high-speed buses, reduce memory-access latency by eliminating off-chip drivers and receivers, and condense system board space by eliminating discrete memory components.

However, it should be understood that the protocol indicator circuitry 420, whether embedded or discrete, may be implemented in any type of memory circuitry and still fall within the scope of the invention. For example, the protocol indicator circuitry 420 may be formed in a dynamic random access memory (DRAM), wherein the states of the memory elements are stored as charge on capacitors Alternatively, the protocol indicator circuitry 420 may be implemented in a non-volatile memory technology such as a read-only memory (ROM) or a flash memory. These types of memory circuitry, and their many variations, will be familiar to one skilled in the art.

The intermediate lookup tables 330-$i$ and final lookup table 340 may also take on various physical forms. For instance, the tables may be implemented in a RAM device to be addressed by the processing circuitry 410 in conjunction with software. In addition, it may be advantageous to implement one or more of the lookup tables in a content-addressable memory (CAM). A CAM is a hardware search engine that is much faster than algorithmic approaches for intensive applications. CAMs are composed of conventional semiconductor memory, usually SRAM, with added comparison circuitry that enables a search operation to complete in a single clock cycle.

CAMs are frequently implemented for search-intensive tasks like lookup functions in network devices. However, the cost of a CAM and its power consumption are related to the size of each entry and the number of entries stored in the CAM. A CAM-based approach for a final lookup table, therefore, may benefit from the use of the intermediate lookup tables 330-$i$ to reduce the size and number of entries required in the final lookup, as described above.

It is noted that there are many techniques of making table lookups, each of which will be familiar to one skilled in the art. These include, but are not limited to, exact match, range match, longest prefix match and ordered search techniques. The choice of one of these techniques will be specific to the particular network application. Any one of these lookup methods would fall within the scope of this invention.

Figure 7:
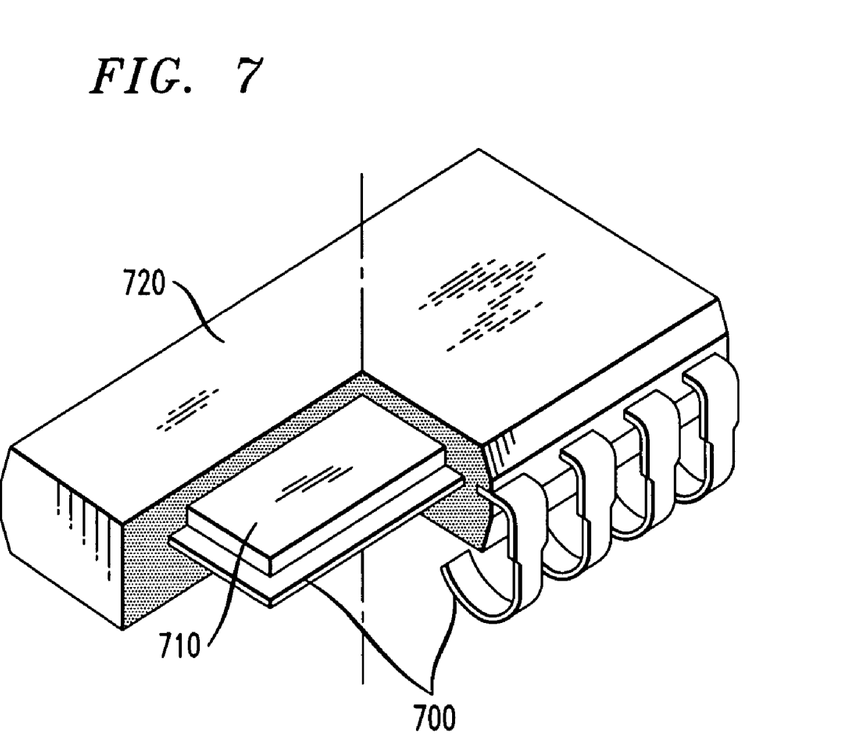
FIG. 7 shows a partial sectional view of a packaged integrated circuit embodying features of the present invention.

Importantly, an integrated circuit including a network processor comprising features of this invention falls within the scope of this invention. The formation of integrated circuits is well known in the art. Generally, a plurality of identical die are formed in a repeated manner on a surface of a semiconductor wafer. Each die includes a device described herein, and may include other structures or circuits. The individual die are cut or diced from the wafer, then packaged as an integrated circuit. FIG. 7 shows an integrated circuit die consistent with this invention packaged in a typical plastic leadframe package. The packaged die comprises a leadframe 700, the die 710, and a plastic mold 720. One skilled in the art would know how to dice wafers and package die to produce integrated circuits.

It should also again be emphasized that the above-described embodiments of the invention are intended to be illustrative only. Other embodiments can use different types and arrangements of elements and steps for implementing the described functionality. These numerous alternative embodiments within the scope of the following claims will be apparent to one skilled in the art.

What is claimed is:

1. A network processor for determining one or more network operations to be performed on a packet of data in a network, the packet of data containing information populating a plurality of protocol header fields, and the network processor comprising:
   processing circuitry; and
   protocol indicator circuitry, the protocol indicator circuitry comprising a plurality of memory elements, the plurality of protocol header fields corresponding to respective ones of the plurality of memory elements, a given one of the plurality of memory elements having a fixed correspondence to a given one of the plurality of protocol header fields regardless of a programmed state of the given memory element;
   wherein the processing circuitry determines the one or more network operations to be performed on the packet of data at least in part by addressing one or more lookup tables with the contents of a subset of the plurality of protocol header fields, the subset determined by reference to the plurality of memory elements, the plurality of memory elements being distinct from the one or more lookup tables;
   wherein the given memory element is programmed to indicate whether the corresponding protocol header field is to be utilized by the processing circuitry in addressing the one or more lookup tables; and
   wherein determining the one or more network operations to be performed on the packet comprises:
   (i) prior to addressing the one or more lookup tables with a given protocol header field, determining by reference to the corresponding memory element whether the given protocol header field is within the subset of the protocol header fields to be utilized in addressing the one or more lookup tables;
   (ii) if the given protocol header field is determined to be within the subset, addressing the one or more lookup tables with the contents of the given protocol header field to obtain a result corresponding to the given protocol header field; and
   (iii) iteratively repeating (i) and (ii) for each of the plurality of protocol header fields, thereby obtaining a separate result for each of the subset of protocol header fields.

2. The network processor of claim 1, wherein the processing circuitry and the protocol indicator circuitry are implemented in the same integrated circuit.

3. The network processor of claim 1, wherein the processing circuitry and the protocol indicator circuitry are implemented in separate integrated circuits.

4. The network processor of claim 1, wherein the processing circuitry is implemented in more than one integrated circuit.

5. The network processor of claim 1, wherein the protocol indicator circuitry is implemented in a random access memory.

6. The network processor of claim 1, wherein the protocol indicator circuitry is implemented in a random access memory in the same integrated circuit as the processing circuitry.

7. The network processor of claim 1, wherein the protocol indicator circuitry is formed in the same integrated circuit as the processing circuitry using complementary metal-oxide-semiconductor technology.

8. The network processor of claim 1, wherein the protocol indicator circuitry is implemented in a non-volatile memory.

9. The network processor of claim 1, wherein at least one of the plurality of memory elements consists of a single bit.

10. The network processor of claim 1, wherein consecutive sequential ones of the plurality of memory elements have a one-to-one association with consecutive sequential ones of the plurality of protocol header fields.

11. The network processor of claim 10, wherein at least one of the plurality of memory elements consists of a single bit.

12. A network device for performing one or more network operations on a packet of data in a network, the packet of data containing information populating a plurality of protocol header fields, and the network device comprising:

a network processor, the network processor comprising processing circuitry and protocol indicator circuitry; and memory circuitry comprising one or more lookup tables;

wherein the protocol indicator circuitry comprises a plurality of memory elements, the plurality of protocol header fields corresponding to respective ones of the plurality of memory elements, a given one of the plurality of memory elements having a fixed correspondence to a given one of the plurality of protocol header fields regardless of a programmed state of the given memory element;

wherein the processing circuitry determines the one or more network operations to be performed on the packet of data at least in part by addressing one or more lookup tables with the contents of a subset of the plurality of protocol header fields, the subset determined by reference to the plurality of memory elements, the plurality of memory elements being distinct from the one or more lookup tables;

wherein the given memory element is programmed to indicate whether the corresponding protocol header field is to be utilized by the processing circuitry in addressing the one or more lookup tables; and wherein determining the one or more network operations to be performed on the packet comprises:
(i) prior to addressing the one or more lookup tables with a given protocol header field, determining by reference to the corresponding memory element whether the given protocol header field is within the subset of the protocol header fields to be utilized in addressing the one or more lookup tables;
(ii) if the given protocol header field is determined to be within the subset, addressing the one or more lookup tables with the contents of the given protocol header field to obtain a result corresponding to the given protocol header field; and
(iii) iteratively repeating (i) and (ii) for each of the plurality of protocol header fields, obtaining a separate result for each of the subset of protocol header fields.

13. The network device of claim 12, wherein the network device comprises at least one of a router, a gateway, a bridge, a switch, a hub and a repeater.

14. The network device of claim 12, wherein at least one of the one or more lookup tables is implemented at least partially in a random access memory.

15. The network device of claim 12, wherein at least one of the one or more lookup tables is implemented at least partially in a content-addressable memory.

16. The network device of claim 12, wherein the network device is capable of forwarding the packet of data to another network device in the network.

17. The network device of claim 12, wherein the network device is capable of performing address translation on the packet of data.

18. The network device of claim 12, wherein the network device is capable of discarding the packet of data.

19. A method for determining one or more network operations to be performed by a network device on a packet of data in a network, the method comprising the steps of:
receiving the packet of data, the packet containing information populating a plurality of protocol header fields; and
determining by a processor of the network device the one or more network operations to be performed on the packet of data at least in part by addressing one or more lookup tables with the contents of a subset of the plurality of protocol header fields;
wherein the subset is determined by reference to a plurality of memory elements, the plurality of protocol header fields corresponding to respective ones of the plurality of memory elements, a given one of the plurality of memory elements having a fixed correspondence to a given one of the plurality of protocol header fields regardless of a programmed state of the given memory element, the plurality of memory elements being distinct from the one or more lookup tables;
wherein the given memory element is programmed to indicate whether the corresponding protocol header field is to be utilized in addressing the one or more lookup tables;
wherein the network device further comprises at least one memory coupled to the processor;
wherein the memory of the network device is operative to store at least one of the one or more lookup tables; and
wherein determining the one or more network operations to be performed on the packet comprises:
(i) prior to addressing the one or more lookup tables with a given protocol header field, determining by reference to the corresponding memory element whether the given protocol header field is within the subset of the protocol header fields to be utilized in addressing the one or more lookup tables;
(ii) if the given protocol header field is determined to be within the subset, addressing the one or more lookup tables with the contents of the given protocol header field to obtain a result corresponding to the given protocol header field; and
(iii) iteratively repeating (i) and (ii) for each of the plurality of protocol header fields, thereby obtaining a separate result for each of the subset of protocol header fields.

20. The method of claim 19, further comprising copying into a processor register the contents of the subset of the plurality of protocol header fields.

21. The method of claim 19, wherein utilizing the contents of the subset of the plurality of protocol header fields to address one or more lookup tables comprises using the result from the addressing of one lookup table to address a different lookup table.

* * * * *

UNITED STATES PATENT AND TRADEMARK OFFICE
CERTIFICATE OF CORRECTION

| | | |
|---|---|---|
| PATENT NO. | : 8,031,706 B2 | Page 1 of 1 |
| APPLICATION NO. | : 11/263300 | |
| DATED | : October 4, 2011 | |
| INVENTOR(S) | : Vinoj N. Kumar et al. | |

It is certified that error appears in the above-identified patent and that said Letters Patent is hereby corrected as shown below:

Claim 1, col. 7, line 58, please delete "perfoimed" and insert --performed--.
Claim 12, col. 9, line 38, please delete "fields, obtaining" and insert --fields, thereby obtaining--.

Signed and Sealed this
Third Day of January, 2012

David J. Kappos
*Director of the United States Patent and Trademark Office*